United States Patent
Geyer et al.

(10) Patent No.: US 11,428,192 B2
(45) Date of Patent: Aug. 30, 2022

(54) MOUNTING ASSEMBLY FOR A ROCKET ENGINE AND ROCKET

(71) Applicant: ArianeGroup GmbH, Taufkirchen (DE)

(72) Inventors: Marc Geyer, Munich (DE); Christian Moritz, Unterhaching (DE)

(73) Assignee: ARIANEGROUP GMBH, Taufkirchen (DE)

( * ) Notice: Subject to any disclaimer, the term of this patent is extended or adjusted under 35 U.S.C. 154(b) by 0 days.

(21) Appl. No.: 17/239,904

(22) Filed: Apr. 26, 2021

(65) Prior Publication Data

US 2021/0355894 A1 Nov. 18, 2021

(30) Foreign Application Priority Data

May 15, 2020 (EP) .................................... 20174985

(51) Int. Cl.
*F02K 9/52* (2006.01)
*F02K 9/60* (2006.01)
*F16M 11/12* (2006.01)

(52) U.S. Cl.
CPC .................. *F02K 9/52* (2013.01); *F02K 9/60* (2013.01); *F02K 9/605* (2013.01); *F16M 11/12* (2013.01); *F05D 2240/35* (2013.01); *F05D 2240/50* (2013.01); *F05D 2240/90* (2013.01)

(58) Field of Classification Search
CPC ... F02K 9/52; F02K 9/60; F02K 9/605; F02K 9/80; F02K 9/805; F16C 19/502; F16C 19/505; F16M 11/12
See application file for complete search history.

(56) References Cited

U.S. PATENT DOCUMENTS

| 2,128,088 A | * | 8/1938 | Hanft | F16D 3/34 |
| | | | | 464/143 |
| 2,887,334 A | * | 5/1959 | Adams, Sr. | F16C 19/50 |
| | | | | 403/127 |
| 3,016,697 A | * | 1/1962 | Sternberg | F02K 9/52 |
| | | | | 60/258 |
| 3,390,899 A | | 7/1968 | Herbet et al. | |

(Continued)

FOREIGN PATENT DOCUMENTS

| FR | 1237219 A | 7/1960 | |
| FR | 2472667 A1 | 7/1981 | |
| WO | WO-8303612 A1 * | 10/1983 | ............ F16C 33/201 |

OTHER PUBLICATIONS

Machine Design, Bearing Retainers or Cages, Nov. 15, 2002, Machine Design (Year: 2002).*

(Continued)

*Primary Examiner* — Todd E Manahan
*Assistant Examiner* — Kyle Robert Thomas
(74) *Attorney, Agent, or Firm* — Taft Stettinius & Hollister LLP

(57) ABSTRACT

The invention relates to a mounting assembly with a spherical bearing for mounting a rocket engine and a rocket having such mounting assembly. The spherical bearing includes a spherical bearing base, a spherical retaining ring and a suspension link with a spherical end arranged in a space between the spherical bearing base and the spherical retaining ring. The spherical bearing base is part of an injector head of the rocket engine or is part of a fuel tank, the parts having a spherical shape.

20 Claims, 3 Drawing Sheets

(56) References Cited

U.S. PATENT DOCUMENTS

Figure 1:
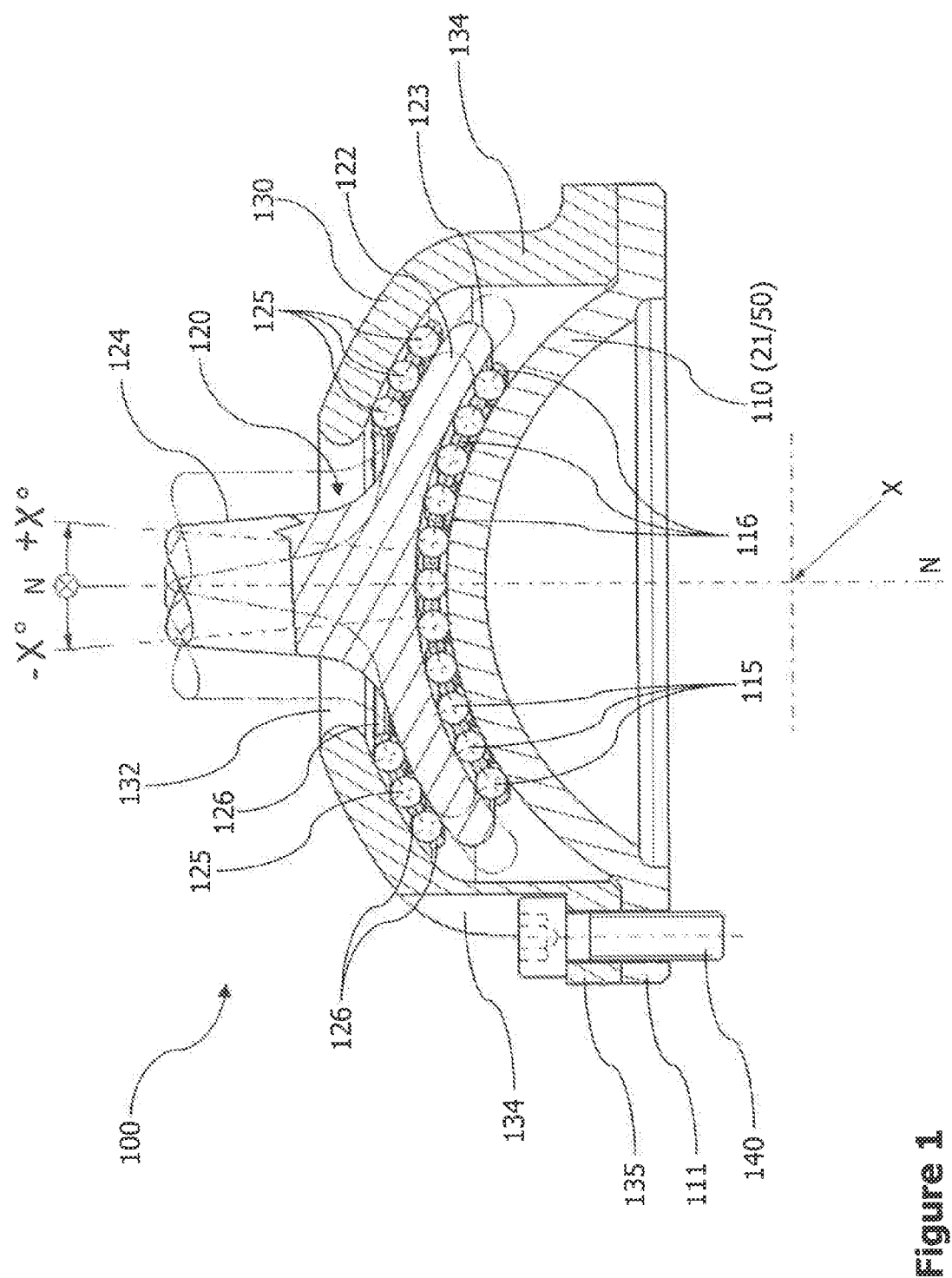

| | | | | |
|---|---|---|---|---|
| 3,464,318 A | * | 9/1969 | Thayer | F15B 13/16 |
| | | | | 91/363 R |
| 3,698,192 A | | 10/1972 | Le Febvre, Jr. | |
| 4,157,788 A | | 6/1979 | Canfield et al. | |
| 4,318,271 A | | 3/1982 | Doukakis et al. | |
| 4,435,023 A | | 3/1984 | Bolner | |
| 2008/0261707 A1 | * | 10/2008 | Jacob | F16D 3/224 |
| | | | | 464/140 |
| 2019/0345984 A1 | * | 11/2019 | Benthien | F16D 3/34 |

OTHER PUBLICATIONS

European Patent Office, Extended Search Report issued in corresponding Application No. 20174985..0, dated Oct. 13, 2020, 6 pp.
Japanese Patent Office, Office Action issued in related JP Application No. 2021-071693, dated May 10, 2022, 3 pp.

* cited by examiner

MOUNTING ASSEMBLY FOR A ROCKET ENGINE AND ROCKET

The invention relates to a mounting assembly with a spherical bearing for mounting a rocket engine and a rocket having such mounting assembly. In particular, the invention relates to a mounting assembly comprising a spherical bearing base, a spherical retaining ring and a suspension link with a spherical end arranged in a space between the spherical bearing base and the spherical retaining ring. The spherical bearing base is part of an injector head of the rocket engine or is part of a fuel tank, the parts having a spherical shape.

A rocket engine is usually mounted to a primary structure of a rocket by a Cardan suspension, such as one or more gimbals combined with another and having differently oriented axes of rotation. This allows movement of the rocket engine, for example, for controlling the thrust acting on the rocket, and, hence steering the rocket. The deflection of the rocket engine is usually not more than a few degrees.

Usually, such mounting structure of a rocket engine requires at least four ball bearings, two for each axis of rotation of the Cardan suspension, around which the rocket engine can pivot. Thus, the mounting structure of a rocket engine is quite complex.

It is therefore an object of the present invention to provide a mounting assembly and a rocket of less complexity.

This object is solved by a mounting assembly with the features of claim 1 and a rocket with the features of claim 10. Preferred embodiments are defined by the dependent claims.

According to a first aspect to better understand the present disclosure, a mounting assembly for a rocket engine comprises a spherical bearing base, and a spherical retaining ring coupled with the spherical bearing base and forming a space between at least a portion of the spherical retaining ring and at least a portion of the spherical bearing base. The mounting assembly further comprises a suspension link having a spherical end, wherein the spherical end is arranged in the space between the spherical bearing base and the spherical retaining ring.

A component mentioned to be "spherical" means that this component comprises at least a portion having the shape of a sector of a sphere. Spherical components of the mounting assembly arranged relative to and interacting with one another are concentric and may share a common radius. For instance, the spherical end of the suspension link may be arranged with respect to the spherical bearing base, so that both components are in contact with one another over substantially the entire area of the spherical end of the suspension link or a distance between both components is substantially the same over substantially the entire area of the spherical end of the suspension link. Likewise, the spherical end of the suspension link may have a contacting area which contacts the spherical retaining ring or may have a distance to the spherical retaining ring that is substantially the same over substantially the entire area of the spherical end of the suspension link overlapping with the spherical retaining ring.

Such mounting assembly allows movement of the suspension link in at least two degrees of freedom like a Cardan suspension link. However, there is no requirement for ball bearings. This reduces complexity of the mounting assembly. In addition, due to the areal contact between spherical bearing base, spherical retaining ring and spherical end of the suspension link, the thrust generated by the rocket engine can be transferred better into the primary structure of the rocket. For instance, the suspension link may be part of the primary structure of the rocket, such as a part of the thrust cone at a bottom portion of the rocket.

In conventional mounting structures for a rocket engine, the force induced by the thrust is transferred via ball bearings (e.g. of a Cardan suspension), which means that the entire force is transferred via a few balls of each ball bearing, such as two balls. Therefore, the ball bearings (of a Cardan suspension) were designed and dimensioned to withstand such high forces, which led to a heavy and bulky mounting structure for the rocket engine.

The disclosed mounting assembly, on the other hand, reduces complexity, weight, and size of the mounting structure between rocket engine and primary structure of the rocket, while it further allows greater forces to be transferred compared to conventional ball bearings.

Moreover, the spherical bearing base of the mounting assembly can be part of an injector head of the rocket engine or can be part of a tank for storing fuel for the rocket engine. Usually these components of a rocket are round shaped or spherical, so that they can be utilised as the spherical bearing base. This allows further reduction of the size of the mounting structure. Optionally, the respective part of the injector head or tank may be strengthened, for example, by stronger or thicker material at least for the portion forming the spherical bearing base. Even including this strengthening of the injector head or tank the entire size of the mounting assembly is still reduced compared to conventional mounting structures.

In an implementation variant, the part of the injector head forming the spherical bearing base can be a dome-shaped spherical end of the injector head facing away from a nozzle of the rocket engine. The end of the injector head facing away from a nozzle of the rocket engine is usually the top part of a combustion chamber and, hence, the top part of the rocket engine. In order to withstand the high pressure generated in the combustion chamber, this end of the injector head is often dome-shaped. Thus, a portion of the injector head can be integrated into the mounting assembly. This avoids any additional height (size) due to a mounting structure and reduces complexity. The end of the injector head may not even be redesigned, since it is constructed to withstand high forces. Optionally, the surface forming the spherical bearing base may be optimised for the sliding/gliding movement of the suspension link.

In another implementation variant, the suspension link can further comprise a strut connected to the spherical end. For instance, the strut may extend from a side of the spherical end opposite the spherical bearing base. The strut and/or the spherical end of the suspension link may be axially symmetric.

Furthermore, the spherical retaining ring can comprise an opening, wherein the strut of the suspension link reaches through the opening. In other words, the spherical retaining ring covers at least a portion of the spherical end of the suspension link and surrounds the strut.

In an implementation variant, an outer diameter of the strut can be smaller than an inner diameter of the opening in the spherical retaining ring. This allows movement of the suspension link with respect to the spherical retaining ring. This movement is limited by the inner diameter (inner edge) of the opening in the spherical retaining ring.

In a further implementation variant, at least one of the contacting surfaces of the spherical bearing base, the spherical retaining ring and the suspension link contacting one another contains and/or is coated with polytetrafluoroethylene (PTFE). For example, the spherical end of the suspension link may have a contacting surface contacting a corresponding surface of the spherical bearing base. Likewise, the spherical end of the suspension link may have a contacting surface contacting a corresponding surface of the spherical retaining ring. Preferably, the contacting surfaces of the spherical end of the suspension link are arranged concentrically to one another and on opposite sides of the suspension link. At least one of these contacting surfaces may be modified to facilitate gliding of the other component gliding thereon. Such modification may comprise a coating reducing frictional forces, one exemplary coating is PTFE.

In yet another implementation variant, the mounting assembly may further comprise a first plurality of balls arranged between the spherical bearing base and the spherical end of the suspension link. The number of the first plurality of balls is preferably greater than two, in order to provide a sufficient amount of transfer points for the forces induced by the thrust of the rocket engine to be transferred between the spherical bearing base and the spherical end of the suspension link. Due to the concentric form of the spherical bearing base and the spherical end of the suspension link, each ball of the first plurality of balls contacts the spherical bearing base as well as the spherical end of the suspension link, and, hence, improves the transfer of forces. Thus, a diameter of each ball the first plurality of balls is the same.

Optionally, the first plurality of balls can be secured in a spherical cage. While the simplest implementation of such cage is a ring holding the outermost balls, the cage may have a spherical shape and a support for at least some of the first plurality of balls. Therefore, a distance between adjacent balls can be predefined and set by the supports in the cage, which allows a uniform distribution of force and transfer points between spherical bearing base and suspension link.

In another implementation variant, the mounting assembly may further comprise a second plurality of balls arranged between the spherical end of the suspension link and the spherical retaining ring. As with the first plurality of balls, the number of balls of the second plurality of balls may be greater than two for an improved transfer of forces between the suspension link and the spherical retaining ring.

Also optionally, the second plurality of balls can be secured in a spherical ring cage. The simplest form of such ring cage is an inner ring securing the second plurality of balls from falling through the opening in the spherical retaining ring. On the other hand, the cage may have a spherical ring shape, i.e. has the form of a section of a sphere including an opening in the section. Thus, the spherical ring cage can be threaded onto (loosely laid around) the strut of the suspension link before the spherical retaining ring is threaded onto (loosely laid around) the strut.

In yet another implementation variant, the spherical retaining ring can comprise a sidewall disposed around a circumferential outer edge of the spherical end of the suspension link and limiting a movement of the suspension link in the space between the spherical bearing base and the spherical retaining ring. In other words, the sidewall of the spherical retaining ring extends from a concentric part of the spherical retaining ring towards the spherical bearing base and thereby delimits at least a portion of the space between the spherical bearing base and the spherical retaining ring.

In a further implementation variant, an outer diameter of the circumferential outer edge of the spherical end of the suspension link is smaller than an inner diameter of the sidewall of the spherical retaining ring. The difference between both diameters defines the possible moving distance of the spherical end of the suspension link within the space defined by the spherical retaining ring, its sidewall and the spherical bearing base, and hence a deflection of the strut around a common centre of the spherical components of the mounting assembly.

According to a second aspect to better understand the present disclosure, a rocket can comprise a rocket engine, a fuel tank, and at least one mounting assembly according to the first aspect or one of its variants for mounting the rocket engine.

For instance, a part of the fuel tank and/or a part of the rocket engine forms the spherical bearing base of one of the mounting assemblies.

The present disclosure is not restricted to the aspects and variants in the described form and order. Specifically, the description of aspects and implementation variants is not to be understood as a specific limiting grouping of features. It is to be understood that the present disclosure also covers combinations of the aspects and variants not explicitly described. Thus, each variant or optional feature can be combined with any other aspect, variant, optional feature or even combinations thereof.

Figure 2:
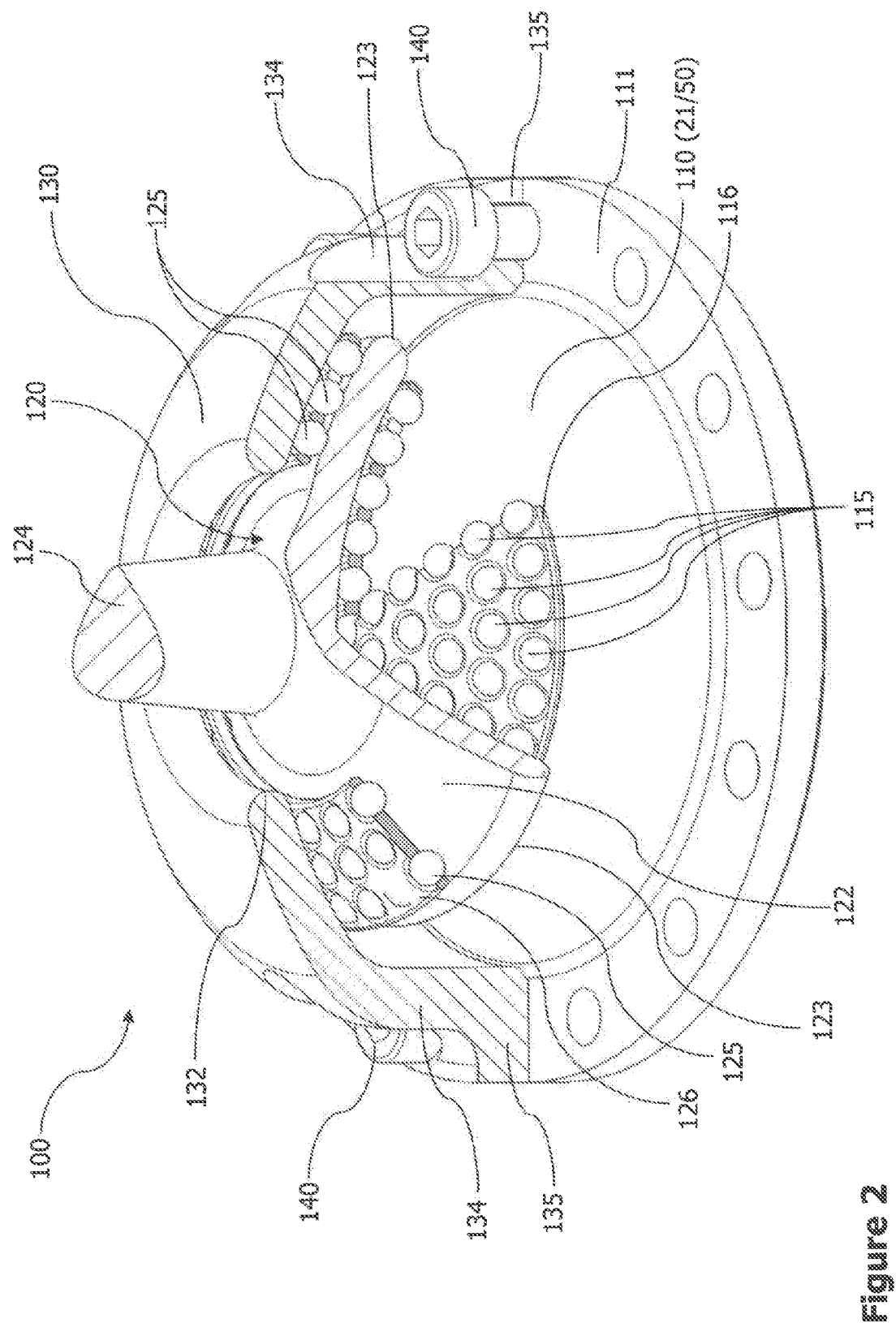
Figure 3:
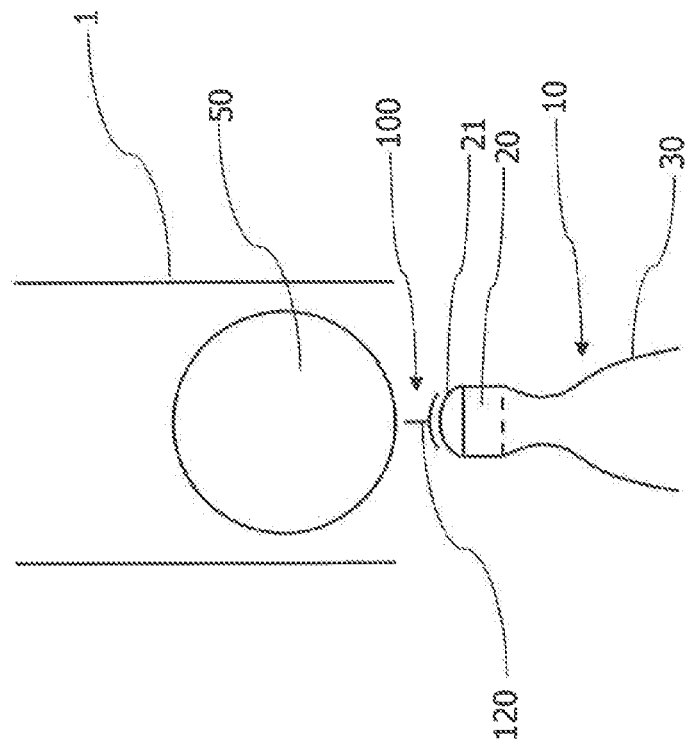

Preferred embodiments of the invention are now explained in greater detail with reference to the enclosed schematic drawings, in which FIG. 1 schematically illustrates a cross-section of a mounting assembly;

FIG. 2 schematically illustrates a perspective view of a mounting assembly partially cut open; and FIG. 3 schematically illustrates a cross-section of a rocket.

FIG. 1 schematically illustrates a cross-section of a mounting assembly 100 for mounting a rocket engine 10, and FIG. 2 schematically illustrates a perspective view of the mounting assembly 100 partially cut open. The mounting assembly 100 includes a bearing base 110. The bearing base 110 can have a spherical shape, i.e. is part of a sphere with a centre X. The spherical bearing base 110 can be part of an injector head 20 of the rocket engine 10 (FIG. 3). For example, an injector head 20 can have a dome-shaped spherical upper end 21, so that it can be integrated easily into the mounting structure for mounting the rocket engine 10. The upper end 21 of the injector head 20 is disposed opposite to a nozzle 30 of the rocket engine 10.

Alternatively, the spherical bearing base 110 can be part of a tank 50 for storing fuel for the rocket engine 10 (FIG. 3). The shape of such fuel tank 50 for a rocket 1 is often a sphere or has at least a spherical portion, in order to withstand the high pressure of the fuel stored in the tank 50 and in order to minimize the surface of the tank 50 for reduced heat losses. Thus, such a portion of the tank 50 can be integrated easily into the mounting structure for mounting the rocket engine 10, for example by forming the spherical bearing base 110 of the mounting assembly 100.

The mounting assembly 100 can further comprise a spherical retaining ring 130 coupled with the spherical bearing base 110. For instance, the spherical retaining ring 130 can be mounted to the spherical bearing base 110 by a plurality of fasteners 140. Such fasteners 140 may couple a flange portion 135 of the retaining ring 130 with a corresponding flange portion 111 of the bearing base 110. Alternatively or additionally, the retaining ring 130 may be welded to the bearing base 110.

The spherical retaining ring 130 is shaped, so that it forms a space between at least a portion of the spherical retaining ring 130 and at least a portion of the spherical bearing base 110. The retaining ring 130 and the bearing base 110 are each sections of a respective sphere sharing a common centre X, i.e. are concentric. The spherical retaining ring 130 may comprise a sidewall 134 disposed around the space between the retaining ring 130 and the bearing base 110. For instance, the sidewall 134 may connect the spherical part with the flange portion 135 of the retaining ring 130.

Inside this space between the retaining ring 130 and the bearing base 110 is a spherical end 122 of a suspension link 120. The spherical end 122 of the suspension link 120 has a thickness (in a radial direction), which is preferably constant and is equal to or smaller than a thickness (in the radial direction) of the space between the spherical retaining ring 130 and the spherical bearing base 110. In addition, a circumferential outer edge 123 of the spherical end 122 of the suspension link 120 may be dimensioned, in order to be spaced apart from the sidewall 134 of the retaining ring 130. Thus, the sidewall 134 limits the movement of the suspension link 120.

While the spherical end 122 may glide on a surface of the bearing base 110 as well as on a surface of the retaining ring 130, a plurality of balls may be arranged between the spherical end 122 and the bearing base 110 as well as between the spherical end 122 and the retaining ring 130. For instance, a first plurality of balls 115 can be arranged between the bearing base 110 and the suspension link 120, and a second plurality of balls 125 can be arranged between the suspension link 120 and the retaining ring 130. Each of the plurality of balls 115, 125 can optionally be secured in a spherical cage 116 and spherical ring cage 126, respectively, which are best illustrated in FIG. 2.

The retaining ring 130 comprises an opening 132, and the suspension link 120 comprises a strut 124 reaching through the opening 132. In order to allow the suspension link 122 move inside the space between the bearing base 110 and the retaining ring 130, an outer diameter of the strut 124 is smaller than an inner diameter of the opening 132 in the spherical retaining ring 130. As illustrated in FIG. 1, the suspension link 120 can move around the centre X by a certain degree (−X° to +X°), for example, the suspension link 120 can deflect from a normal N by up to approximately 20°, preferably by up to approximately 15° and more preferably, by up to approximately 10°. This movement is limited by the inner diameter of the opening 132 and/or the inner diameter of the sidewall 134 of the retaining ring 130. Of course, the movement of the suspension link 120 is also limited by an outer diameter of the strut 124 in relation to the inner diameter of the opening 132 and/or an outer diameter of the circumferential outer edge 123 of the spherical end 122 of the suspension link 120 in relation to the inner diameter of the sidewall 134.

While FIG. 1 illustrates a movement of the strut 124 of the suspension link 120 relative to the bearing base 110 and retaining ring 130, it is to be understood that the strut 124 may be fixedly connected with the primary structure of the rocket 1, so that the bearing base 110 and retaining ring 130 move relative to the suspension link 120. In other words, while the suspension link 120 is fixed with respect to the rocket 1, the rocket engine 10 can be moved around the centre X by the above amount −X° to +X°.

FIG. 3 illustrates schematically a portion of a cross-section of a rocket 1. Particularly, FIG. 3 illustrates a bottom portion of the rocket 1 including a tank 50 and a rocket engine 10. The rocket engine 10 comprises a nozzle 30 and an injector head 20, which usually includes a combustion chamber. The fuel burned in the combustion chamber exits through the nozzle 30 and generates thrust in an upward direction in FIG. 3. This thrust is transferred via a mounting assembly 100 to the remaining portion of the rocket 1, for example, into a primary structure (not illustrated) of the rocket 1.

While FIG. 3 illustrates the mounting assembly 100 as having a spherical bearing base 110 integrated into the dome-shaped end 21 of the injector head 20, the spherical bearing base 110 can alternatively be integrated into a portion of the tank 50.

Of course, the rocket 1 may have a mounting structure for mounting the rocket engine 10 that includes two mounting assemblies 100, wherein a portion of the tank 50 and at least a portion of the upper end 21 of the injector head 20 each forms a respective spherical bearing base 110 of each mounting assembly 100. Such pair of mounting assemblies 100 can even share a common strut 124, i.e. a suspension link 120 having a single strut 124 and two spherical ends 122 on opposite sides of the strut 124, each interacting with a respective bearing base 110 and retaining ring 130 of the pair of mounting assemblies 100.

The invention claimed is:

1. A mounting assembly for a rocket engine, the mounting assembly comprising:
   a spherical bearing base;
   a spherical retaining ring coupled with the spherical bearing base and forming a space between at least a portion of the spherical retaining ring and at least a portion of the spherical bearing base;
   a suspension link having a spherical end, wherein the spherical end is arranged in the space between the spherical bearing base and the spherical retaining ring,
   a first plurality of balls arranged to contact the spherical bearing base and the spherical end of the suspension link,
   a second plurality of balls arranged to contact the spherical end of the suspension link and the spherical retaining ring,
   wherein the spherical bearing base is in areal contact with the spherical end of the suspension link via the first plurality of balls and the spherical end of the suspension link is in areal contact with the spherical retaining ring via the second plurality of balls, and
   wherein the spherical bearing base is part of an injector head of the rocket engine or is part of a tank for storing fuel for the rocket engine.

2. The mounting assembly of claim 1, wherein the part of the injector head forming the spherical bearing base is a dome-shaped spherical end of the injector head facing away from a nozzle of the rocket engine.

3. The mounting assembly of claim 2, wherein the suspension link further comprises a strut connected to the spherical end, and wherein the spherical retaining ring comprises an opening, the strut reaching through the opening.

4. The mounting assembly of claim 3, wherein an outer diameter of the strut is smaller than an inner diameter of the opening in the spherical retaining ring.

5. The mounting assembly of claim 4, wherein at least one of the contacting surfaces of the spherical bearing base, the spherical retaining ring and the suspension link contacting one another is coated with polytetrafluoroethylene.

6. The mounting assembly of claim 5, wherein the first plurality of balls is secured in a spherical cage.

7. The mounting assembly of claim 6, wherein the second plurality of balls is secured in a spherical ring cage.

8. The mounting assembly of claim 7, wherein the spherical retaining ring comprises a continuous sidewall disposed around a circumferential outer edge of the spherical end of the suspension link and limiting a movement of the suspension link in the space between the spherical bearing base and the spherical retaining ring.

9. The mounting assembly of claim 1, wherein the suspension link further comprises a strut connected to the spherical end, and wherein the spherical retaining ring comprises an opening, the strut reaching through the opening.

10. The mounting assembly of claim 9, wherein an outer diameter of the strut is smaller than an inner diameter of the opening in the spherical retaining ring.

11. The mounting assembly of claim 10, wherein at least one of the contacting surfaces of the spherical bearing base, the spherical retaining ring and the suspension link contacting one another is coated with polytetrafluoroethylene.

12. The mounting assembly of claim 11, wherein the first plurality of balls is secured in a spherical cage.

13. The mounting assembly of claim 12, wherein the second plurality of balls is secured in a spherical ring cage.

14. The mounting assembly of claim 13, wherein the spherical retaining ring comprises a continuous sidewall disposed around a circumferential outer edge of the spherical end of the suspension link and limiting a movement of the suspension link in the space between the spherical bearing base and the spherical retaining ring.

15. The mounting assembly of claim 14, wherein an outer diameter of the circumferential outer edge of the spherical end of the suspension link is smaller than an inner diameter of the sidewall of the spherical retaining ring.

16. The mounting assembly of claim 1, wherein at least one of the contacting surfaces of the spherical bearing base, the spherical retaining ring and the suspension link contacting one another is coated with polytetrafluoroethylene.

17. The mounting assembly of claim 1, wherein the first plurality of balls is secured in a spherical cage.

18. The mounting assembly of claim 1, wherein the second plurality of balls is secured in a spherical ring cage.

19. The mounting assembly of claim 1, wherein the spherical retaining ring comprises a continuous sidewall disposed around a circumferential outer edge of the spherical end of the suspension link and limiting a movement of the suspension link in the space between the spherical bearing base and the spherical retaining ring.

20. A rocket, comprising:
 a rocket engine;
 a fuel tank; and
 a mounting assembly for mounting the rocket engine comprising:
  a spherical bearing base,
  a spherical retaining ring coupled with the spherical bearing base and forming a space between at least a portion of the spherical retaining ring and at least a portion of the spherical bearing base,
  a suspension link having a spherical end, wherein the spherical end is arranged in the space between the spherical bearing base and the spherical retaining ring,
  a first plurality of balls arranged to contact the spherical bearing base and the spherical end of the suspension link,
  a second plurality of balls arranged to contact the spherical end of the suspension link and the spherical retaining ring,
 wherein the spherical bearing base is in areal contact with the spherical end of the suspension link via the first plurality of balls and the spherical end of the suspension link is in areal contact with the spherical retaining ring via the second plurality of balls, and
 wherein the spherical bearing base is part of an injector head of the rocket engine or is part of a tank for storing fuel for the rocket engine.

* * * * *